Aug. 10, 1937.  E. G. ERICSSON  2,089,352
SNOW CHAIN FOR AUTOMOBILE WHEELS
Filed Oct. 5, 1935
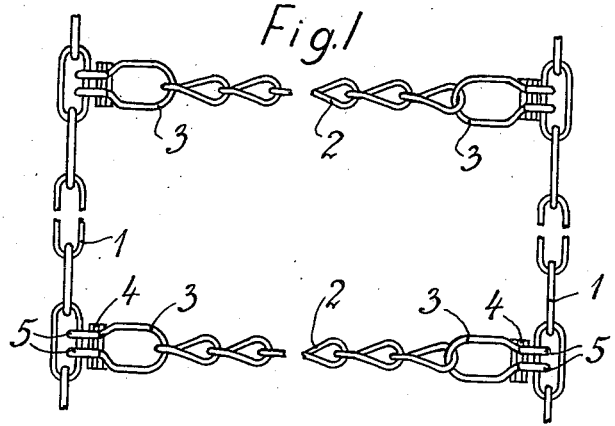
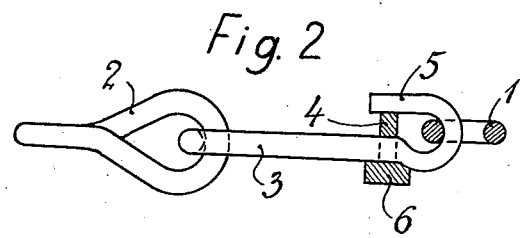
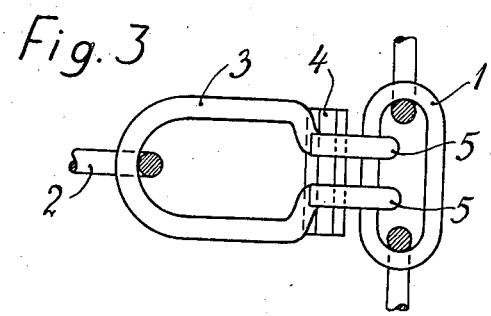
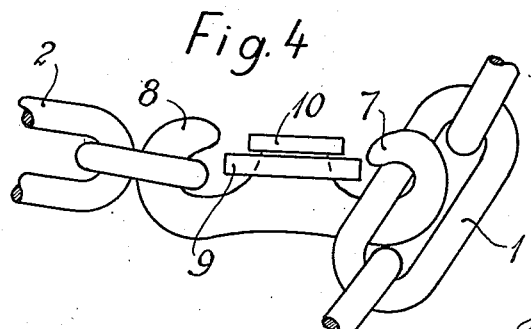
Inventor:
Emil G. Ericsson.
By Frederick W. Barker.
Attorney.

Patented Aug. 10, 1937

2,089,352

UNITED STATES PATENT OFFICE 2,089,352

SNOW CHAIN FOR AUTOMOBILE WHEELS

Emil Gottfrid Ericsson, Verkeback, Sweden

Application October 5, 1935, Serial No. 43,734
In Norway October 10, 1934

2 Claims. (Cl. 24—236)

Object of the present invention is a coupling device especially for snow chains for automobile wheels but also usable for other purposes.

Characteristical to the invention is the employment of a latch composed of pliable and resilient material in the form of a tongue directed transversely to the length direction of the chain link, for securing on one hand a safe coupling after the connecting hooks are placed on the chain and allowing on the other hand an easy disconnecting without special implements.

The main purpose of the invention is to furnish a safe connecting link for snow chains for automobile wheels so as to make it possible to remove the cross chains after wearing and substitute new chains without sending the same to a workshop.

The invention is illustrated in the accompanying drawing.

Fig. 1 shows a snow chain with cross parts according to the invention connected to the carrying parts.

Fig. 2 shows the coupling link upon a larger scale partly in section.

Fig. 3 is a plan view of the same partly in section.

Fig. 4 is a perspective view of a modified form.

In Figures 1 to 3 inclusive, 1, 1 are the carrying chains intended to be placed on each side of the wheel. The chains 1, 1 are connected to each other by means of cross chains 2 each of which is connected to the longitudinal chains by means of special cross links. Such links consist of a shackle 3 provided with hooks 5 the planes of which are arranged at a right angle to the plane of the shackle and which may be hooked on the chains 1. In order to secure the connection a plate 4 of pliable and resilient material in the form of a tongue directed transversely to the length direction of the chain link may be placed on the hooks. In order to prevent the same from being displaced it is furnished with an extended lower part 6 the cross section being similar to a T. Further the shackle is narrowed at the root of the hooks 5 so that the latch cannot be displaced outwards. The distance between the hooks is sufficiently large to allow a hooking in of the chain without deformation of the hooks 5, 5. The latch 4 is provided with apertures to receive the hooks 5, 5.

The connection may be established in the following manner.

First the connecting link 3 is hooked into the chain 2. Then the latch 4 is placed over the hook 5 and the chain 1 hooked in the latch 4 being flexed when placing the same. Hereby an undesirable releasing is prevented. However, the chauffeur might easily disconnect the coupling by flexing the latch 4 outwards.

According to Fig. 4 a coupling link is used having two hooks 7, 8 in the same plane. One hook may be connected to the chain 1, another to the cross chain 2 and the connection may be secured by means of a pliable and resilient tongue 9 which is fastened to the link by means of a head 10 on its supporting stem.

I claim:

1. A chain link for snow chains for automobile wheels characterized by a latch made from pliable and resilient material in the form of a tongue directed transversely to the length direction of the link, said link consisting of a shackle having narrowed ends forming hook legs bent to a plane at a right angle to the plane of the shackle, and the latch being provided with apertures corresponding to the hook legs.

2. A chain link in snow chains for automobile wheels characterized by a latch made from pliable and resilient material in the form of a tongue directed transversely to the length direction of the link, said link consisting of a shackle having narrowed ends forming hook legs bent to a plane at a right angle to the plane of the shackle, and the latch being provided with apertures corresponding to the hook legs and provided with an extension to engage the bent portion of the shackle so as to be maintained in place.

EMIL GOTTFRID ERICSSON.